April 28, 1936.　　　　E. S. PURINGTON　　　　2,038,873
POSITION DETERMINING APPARATUS
Filed April 29, 1933　　　2 Sheets-Sheet 1
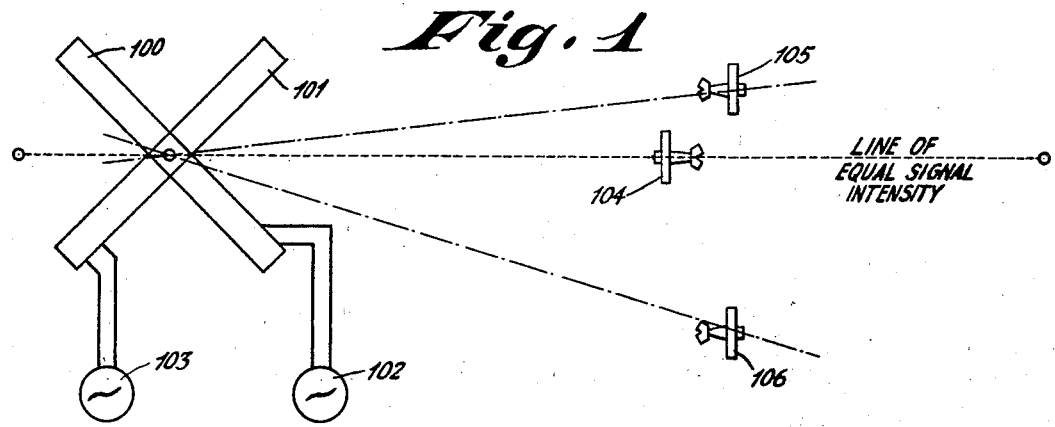
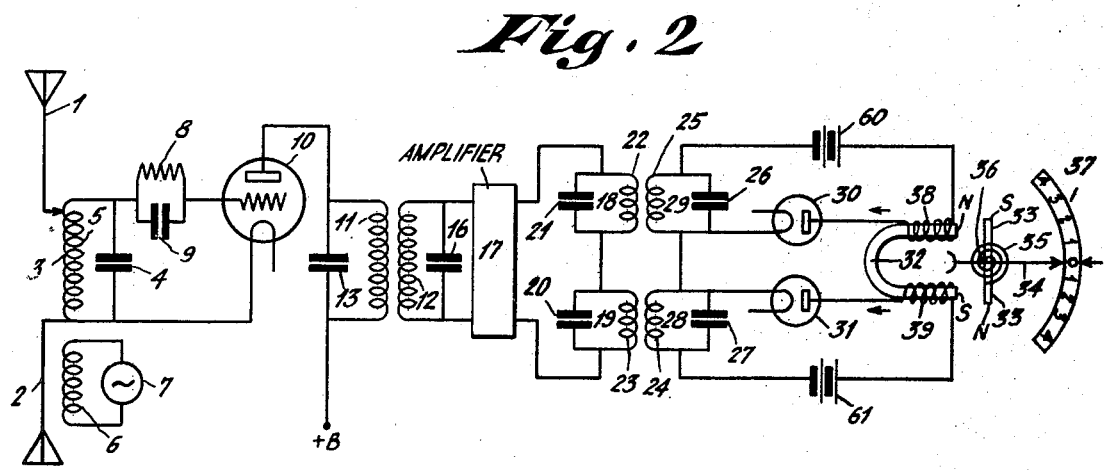
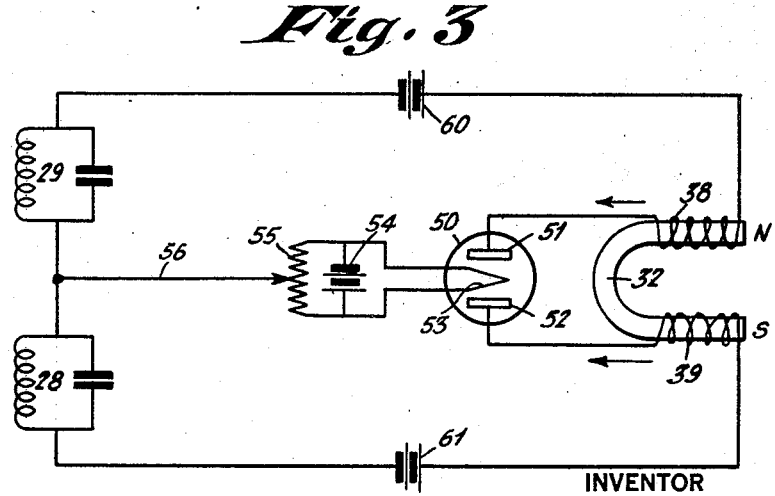
INVENTOR
ELLISON S. PURINGTON
BY 7H. G. Grover
ATTORNEY April 28, 1936. E. S. PURINGTON 2,038,873
POSITION DETERMINING APPARATUS
Filed April 29, 1933 2 Sheets-Sheet 2

INVENTOR
ELLISON S. PURINGTON
BY
ATTORNEY

Patented Apr. 28, 1936

2,038,873

UNITED STATES PATENT OFFICE 2,038,873

POSITION DETERMINING APPARATUS

Ellison S. Purington, Gloucester, Mass., assignor to John Hays Hammond, Jr.

Application April 29, 1933, Serial No. 668,482

2 Claims. (Cl. 250—11)

The present invention relates generally to directive beacon systems and more particularly to a system for guiding vessels, planes or other craft along proper courses.

It is an object of the present invention to devise a system by which through the medium of transmitted electrical waves a vessel or the like may be able to determine directly its proper course.

It is another object of the present invention to devise means through the operation of which the pilot of a vessel or the like is advised as to the direction and extent that the vessel deviates from its prescribed course.

A further object of the invention is to provide apparatus to transmit directional signals by electrical waves by means of which vessels, aircraft and the like may be guided.

A still further object of the invention is to provide receiving apparatus for intercepting the transmitted beacon energy and derive therefrom the necessary information to indicate to the pilot the extent and direction of deviation, if any, from the prescribed course of the vessel.

Specific objects of the invention will be apparent from the following specification when read in connection with the appended drawings.

Briefly, the present invention is based upon the utilization of crossed loops for directive transmission. In the system disclosed, two crossed loops are respectively energized by different frequency continuous waves to give the desired distinguishing characteristics. Consequently, the system involves the receipt of the transmitted continuous waves by continuous wave receivers, a feature of the invention which results in particularly efficient operation.

The present invention should be distinguished from known directive beacon systems utilizing crossed loops all transmitting waves of the same frequency but modulated by different audio frequencies for providing the necessary distinguishing characteristics. In the latter type much trouble is met with in designing proper and efficient apparatus especially when visual recording is contemplated because of difficulties encountered in the required selective systems.

In the drawings,

Fig. 1 illustrates schematically a directive transmitting system which may be utilized in connection with the present invention;

Fig. 2 is a diagrammatic representation of a preferred type of receiver used for receiving signals transmitted from a system such as shown in Fig. 1;

Fig. 3 is a diagrammatic showing of an alternative form of a portion of the receiver circuit of Fig. 2;

Figure 4:
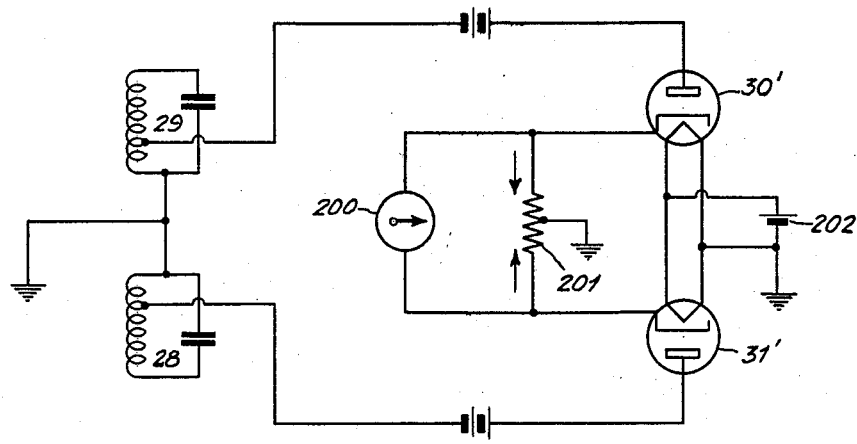
Fig. 4 is a preferred form of the invention using indirectly heated half wave rectifiers; and, Fig. 5 is another form of the invention utilizing a single tube arrangement.

In the present invention the two crossed loops previously referred to are in reality a pair of loop antennæ having a common axis. The coils of the respective loops are constructed so as to be at some suitable angle with respect to each other. Each loop is energized by continuous high frequency waves, energy received from any particular loop being distinguished from energy received from another loop of the system by the frequency of the high frequency waves. Preferably the intensity characteristics of the waves transmitted from all the loops are the same, thus other things being equal, a receiver located on a line bisecting the angle formed by the two loop antennæ will receive equal intensity signals from both transmitting loops. A receiver located to one side of the angle bisector will receive stronger signals from one loop and weaker signals from the other loop, whereas, a receiver located to the other side of the bisector will receive weaker signals from the first mentioned loop than from the second loop.

It is evident now that a vessel provided with suitable receiving apparatus for receiving signals from both loops and also provided with suitable signal intensity comparing or indicating means which preferably takes the form of a differential indicator, may be steered or guided along a definite course even in foggy weather. Thus if the course to be followed is in fact the angle bisector, that is, the line or zone of equal signal intensity, the pilot would steer the craft so that the signal intensity indicator would indicate receipt of equal intensity signals from each of the two transmitting loops of the system. The pilot is able to recognize that he is off his course, that is to say, off the line or zone of equal signal intensity by the fact that the signal intensity comparing device or indicator shows the receipt of unequal intensity signals from the two loop transmitters.

In other words, under these conditions the differential indicator is, so to speak, off balance, the extent it is off balance to one side or the other of the balance point showing the pilot the extent and direction of deviation from the intended course.

In Figure 1, a beacon transmitter system is shown as comprising a pair of crossed loop antennæ 100 and 101 energized by the different frequency high frequency generators or sources 102 and 103 respectively. The line 00 passing through the common axis of the two loops 100 and 101 is the previously referred to line of equal signal intensity. Thus with equal intensity energy transmitted from the two loops 100, 101 and other things being equal, a receiver located on the line 00, as for instance on the airplane 104, would receive equal intensity signals from the two loop transmitters. A receiver located on the plane 105 would then receive stronger signals from loop 101 than from loop 100, whereas, a receiver located on plane 106, would receive stronger signals from loop 100 than it would receive from loop 101. Also, the ratio of signal intensity of signals received from antenna 101 and signals received from antenna 100 at 105 is much less than the ratio of signal intensity of signals received from antenna 100 and signal received from antenna 101 at 106 because of the fact that plane 106 is further away from the line or zone of equal signal intensity 00 than is plane 105. However, the off balance conditions of the indicator would be in one direction with regard to the balance point at 105 and in the other direction at 106.

It is obvious that the two loops 100 and 101 may be rotated about their common axis so as to fix the zones of equal signal intensity in any desired direction.

The receiver shown in Fig. 2 comprises antenna 1 and counterpoise 2 adapted to impress energy intercepted thereby upon the input circuit of a space discharge device 10. The input circuit comprises a tuned circuit 5 which includes inductance coil 3 and tuning condenser 4 adjusted so as to be bi-resonant, that is, equally responsive to the two frequencies as generated at 102, 103 (Fig. 1) and transmitted by the two loops 100 and 101 respectively.

Tube 10 is in reality a mixing tube deriving this characteristic by reason of the grid condenser, grid leak arrangement 9, 8 respectively. Tube 10 also is provided with the usual output circuit comprising inductance 11, shunted condenser 13 and anode potential source indicated as B+. Coupled to the coil 3, through suitable coil 6 is a source of peferably constant frequency oscillations 7. It is obvious now, since tube 10 is a mixer tube, that energy impressed across coil 3 from the antenna counterpoise 1, 2 is combined with the energy generated at 7 and in the output circuit of tube 10 there exist what are known as "beat frequencies" resulting from combining the various frequencies impressed upon the input of the tube. Since three frequencies are impressed upon the input circuit 5, namely, oscillations from generators 102 and 103 and oscillations from source 7, it is obvious that the output circuit of tube 10 will include several beat frequencies. Among the beat frequencies that stand out are the sum and difference of the frequencies of 102 and 7 and the sum and difference of the frequencies of 103 and 7. For example, if it is assumed that generator 102 produces oscillations of frequency equal to 303,000 cycles per second, generator 103 produces oscillations having a frequency equal to 297,000 cycles per second and source 7 oscillations having a frequency equal to 323,000 cycles then it is seen that in the output of tube 10 there will be present among others oscillations of 26,000 cycles per second and 20,000 cycles per second. The 26,000 cycles energy may then be said to be representative of the energy transmitted by loop 101, whereas, the 20,000 cycles energy is representative of the energy transmitted by loop 100, and these two frequencies are isolated from the rest of the other beat frequencies and allowed to pass to an amplifier circuit 17 from the output of tube 10. The input of the amplifier 16 comprises a tuned circuit including inductance coil 12 and tuning condenser 16.

The circuit comprising coil 11 and condenser 13 and the circuit coupled thereto comprising coil 12 and condenser 16 are preferably made so as to present double resonance characteristics, that is, the two circuits resonate equally to the two frequencies 20,000 cycles and 26,000 cycles. Amplifier 17 may comprise one or more stages of cascaded amplifier tubes connected in any of the well known methods such as resistance, impedance, transformer, direct and/or capacitive coupling. The output circuit of the amplifier 17 which may be the output circuit of the last stage thereof includes a pair of tuned circuits 18 and 19. Circuit 18 comprising an inductance coil 22 and a shunted condenser 21 is resonant to 20,000 cycles and will, therefore, isolate the amplified oscillations of that frequency. Circuit 19 comprising coil 23 and tuning condenser 20 is tuned to a frequency of 26,000 cycles, hence, this circuit will tend to isolate the amplified oscillations of that frequency. It follows that tuned circuits 18 and 19 separate the two frequencies fed into the input of amplifier 17 after both are amplified. The amplified 20,000 cycle oscillations are then impressed upon a similarly tuned circuit 29 which comprises an inductance coil 25 and a tuning condenser 26 while the amplified 26,000 cycle oscillations are impressed upon circuit 28 tuned to resonate at 26,000 cycles by coil 24 and condenser 27.

Tuned circuit 29 forms part of a series circuit which includes a source of current 60, a winding 38 and a power type rectifier 30. It is seen then that the energy impressed upon circuit 29 from circuit 18 is, in effect, rectified by tube 30 so that there flows a current through coil 38 as indicated by the arrow the intensity of which is, in fact, proportional to the intensity of the energy intercepted by antenna 1 transmitted by loop 100. Tuned circuit 28 similarly forms part of a series circuit which includes source 61, winding 39 and power type rectifier 31.

Consequently, the energy impressed upon circuit 28 from circuit 19 is rectified by tube 31 and there flows a current through winding 39 in the direction indicated by the arrow the intensity of which is proportional to the intensity of the energy intercepted by antenna 1 transmitted by loop 101. Windings 38 and 39 may form part of a double winding ammeter the component parts of which comprise an iron U-shaped core 32 the center of which is magnetically grounded on the opposite legs of which the windings 38 and 39 are wound, a balanced polarized armature 33 pivoted about a point 36 preferably at its midpoint, a balancing spring 35 arranged with respect to armature 33 so as to tend to maintain the armature at its mean position, an indicator needle 34 fixed to armature 33 and a cooperating scale 37. The ammeter is preferably arranged so that current flowing in winding 38 magnetizes core 32 in a sense that it tends to rotate armature 33 counter-clockwise about pivot point 36 against the action of spring 35 while current flowing in winding 39 magnetizes core 32 in a sense to rotate armature 33 clockwise against the action of spring 35. It is obvious then that with equal current flowing in both windings 38 and 39 as when the receiver is located on craft 104 (Fig. 1) armature 33 is not rotated and needle 34 reads zero on scale 37. With the receiver on plane 105 the current flow in winding 38 would be less than the current flow in winding 39, hence, needle 34 would swing clockwise a comparatively small amount determined by the ratio of the intensity of the two currents. The needle 34 on a receiver located on plane 106 would swing counter-clockwise a comparatively large amount as determined by the ratio of the intensities of the two currents flowing in windings 38 and 39 of the particular receiver on plane 106.

It is obvious from what has preceded that to obtain useful readings as to the course of the craft upon which the receiver system shown in Fig. 2 is located, it is preferable to construct the two branch circuits which include the tubes 30 and 31 so that they have substantially the same characteristics. While it is a comparatively simple matter to construct two circuits having similar characteristics, it is a fact that tubes having sufficiently similar characteristics throughout the operating ranges are not so easily constructed in quantity production. Consequently, matched tubes entail greater expense and inconvenience. To overcome this drawback, the system shown in Fig. 3 is presented. In this system in place of two detector tubes 30 and 31 there is provided a single tube 50 which is composed of a single cathode 53 and two anodes 51 and 52. The cathode 53 is energized by a suitable source 54 connected across the cathode. Only that portion of the complete circuit is shown in Fig. 3 as is necessary for a proper understanding of the device. Thus, it will be noted that tuned circuits 28 and 29 of Fig. 3 correspond to the tuned circuits 28 and 29 of Fig. 2, sources 60 and 61 of Fig. 3 correspond to sources 60 and 61 of Fig. 2, core 32 of Fig. 3 is the same as core 32 of Fig. 2 and the windings 38 and 39 are also similar in both figures. In order to connect the tube 50 to both circuits there is provided a resistance 55 which is shunted across the cathode and the connection to both anodes is made through a conductor 56 from a point of the resistance 55. It should be noted that the conductor 56 is provided with an adjustable element for tapping on to the resistance 55. This is for the purpose of adjustment whereby the two circuits may be made symmetrical with respect to both windings 38 and 39.

It is believed to be obvious from what has thus far been described that the energy impressed upon circuit 29 is rectified by the tube 50 and flows through the winding 38 in the direction of the arrow. Energy impressed upon circuit 28 is also rectified by the tube 50 and this energy passes through the winding 39 as indicated by the arrow, the current flow in each circuit being as follows:

From tube circuit 29 through the source 60, through winding 38, to plate 31, to the cathode 53, through conductor 56 back to tuned circuit 29 for the first case and from tuned circuit 28 through source 61, through winding 39, to plate 53, to cathode 53 and back to the tuned circuit 28 through conductor 56 for the second case. It is obvious now that the windings 38 and 39 of Fig. 3 are affected by the energy impressed upon tuned circuits 29 and 28 in the same manner that the windings 38 and 39 of Fig. 2 are affected by the energy impressed upon tuned circuits 29 and 28 of said Fig. 2.

In Fig. 4, a slightly different circuit arrangement is shown wherein the readings are provided by a meter 200 which may be a commercial type D. C. instrument with pointer in the center and capable of either right or left deflection. Tubes 30' and 31' are half wave rectifiers having indirectly heated cathodes. The heater circuit for both tubes is supplied by a suitable source shown for convenience as a battery 202. Resistance 201 grounded at its midpoint is shunted across the instrument. Current flows through resistance 201 from each tube as indicated by the arrows. It is to be understood that copper oxide rectifiers may be substituted for the tubes shown in the drawings.

Figure 5:
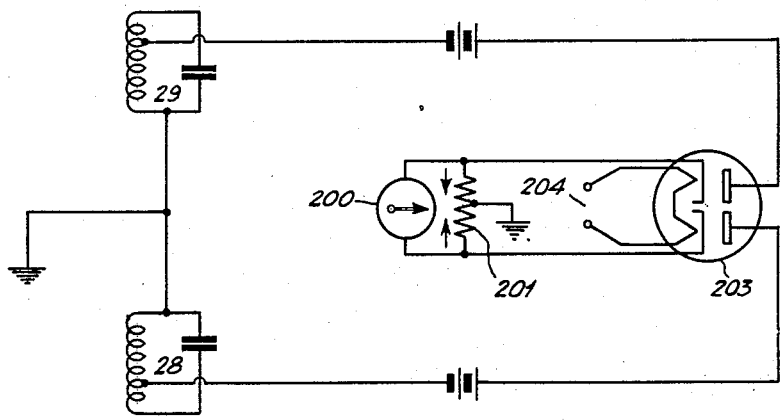

The system shown in Fig. 5 is the same as Fig. 4 except that a single tube 203 is provided having two anodes and two indirectly heated cathodes. The single heater circuit for the two cathodes is connected to the terminals 204.

Since the operation of the system disclosed by applicant is believed to have been made clear from the above description of the various circuits a detailed discussion will be omitted.

In practice, the meter scale 37 may read for example "on course" when at zero indication, "north of course" for deflections of the needle 34 in one direction and "south of course" for deflections of the needle in the opposite direction. It is to be understood that any suitable type of indications may be provided, in fact, the choice thereof is solely dependent on the wishes of the designer and the pilot.

Applicant desires it to be understood that the particular values of the various frequencies chosen above are solely for purposes of illustration and not limitation and further that any suitable values of these frequencies may be chosen.

I claim:

1. In a system for transmitting and translating directive radio signals of the type provided with means for producing two different frequency but equal amplitude continuous radio frequency waves, means for independently and directionally transmitting said waves, comprising two crossed loop antennae the combined transmission characteristics of which produce at least one zone of equal signal intensity and means for predetermining the spacial location of said zone, means for locating a particular reception point with respect to the zone of equal signal intensity comprising in combination, means for intercepting the transmitted waves including an antenna arrangement having equal reception characteristics for all of said transmitted different frequency waves, a source of constant frequency oscillations differing from the frequency of each of the transmitted waves, a combining circuit for mixing the received energy waves with energy from said source, a selector circuit for selecting at least one product from the combination of each energy wave with energy from the source, means for segregating each of the selected products, means for separately rectifying the segregated products, means for producing from the rectified segregated products equivalent magnetic forces, means for combining these magnetic forces in a sense to compare their respective intensities and means for producing a single indication of their relative intensities.

2. In a system for comparing the relative intensities of two radio frequency waves, a source of auxiliary frequency energy differing in frequency from the frequency of the two waves to be compared, a combining circuit for mixing the two radio frequency waves with the auxiliary frequency energy, a selector circuit means arranged so as to select at least one product from the combination of each radio frequency wave with the auxiliary frequency energy, means for segregating each of the selected products, means for separately detecting the segregated products, means for transforming each of the products of said detection into equivalent magnetic energy, means for combining the resultant magnetic energies in a sense to compare their respective intensities and means for producing a single indication of their relative intensities.

ELLISON S. PURINGTON.